G. W. JOHNSON.
AUTOMOBILE TIRE.
APPLICATION FILED JAN. 25, 1918.
1,298,731.
Patented Apr. 1, 1919.
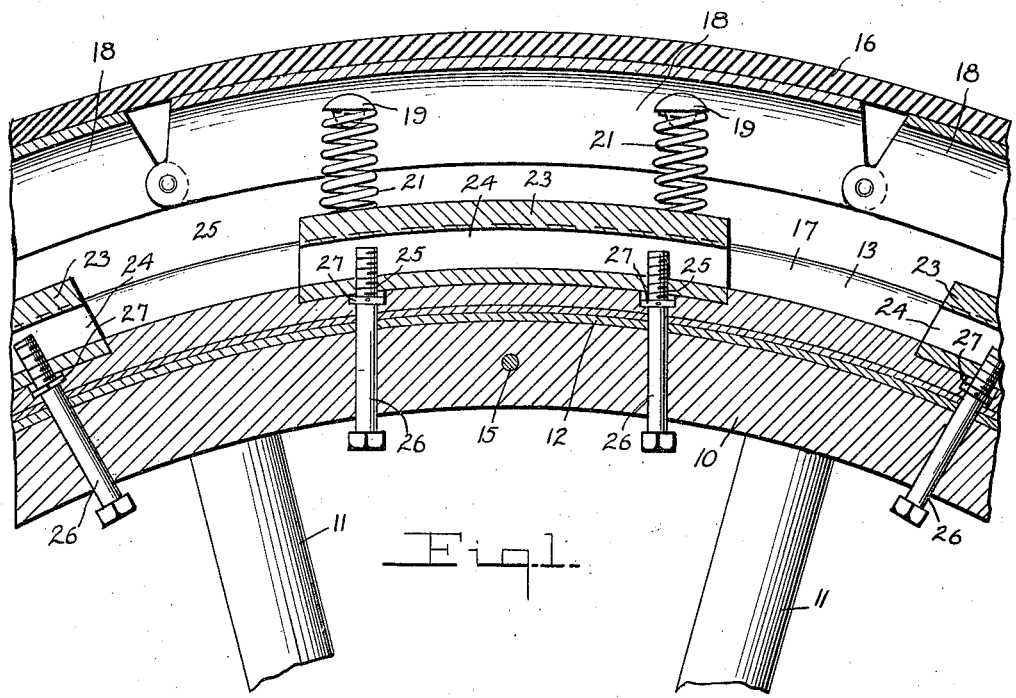
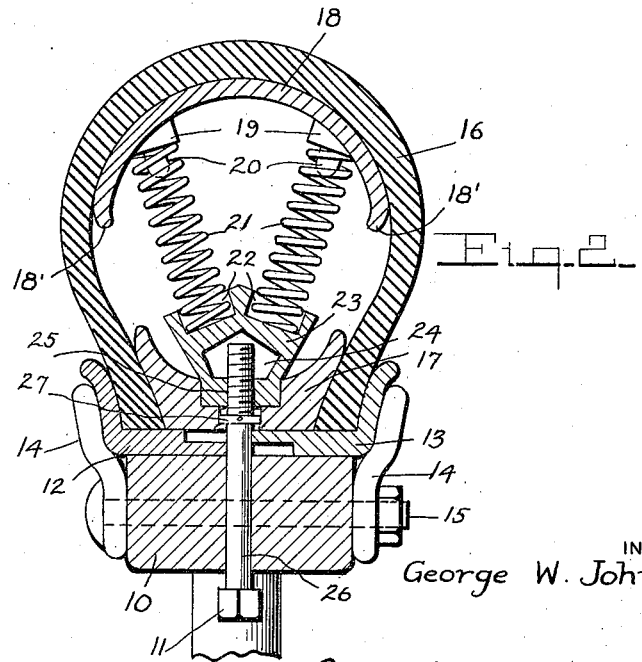
INVENTOR
George W. Johnson
BY
ATTORNEY

UNITED STATES PATENT OFFICE.

GEORGE W. JOHNSON, OF THREE FORKS, MONTANA.

AUTOMOBILE-TIRE.

1,298,731.  Specification of Letters Patent.  Patented Apr. 1, 1919.

Application filed January 25, 1918. Serial No. 213,750.

*To all whom it may concern:*

Be it known that I, GEORGE W. JOHNSON, a citizen of the United States, residing at Three Forks, in the county of Gallatin and State of Montana, have invented certain new and useful Improvements in Automobile-Tires, of which the following is a specification.

This invention relates to an improved resilient tire and the principal object of the invention is to provide an improved resilient tire having plates mounted therein and yieldably held in engagement with the tread portion of the tire through the medium of springs carried by improved spring holding plates connected with the rim of the wheel.

Another object of the invention is to mount the spring holding plates that may be adjusted to regulate the tension of the springs.

Another object of the invention is to so construct this improved resilient tire that the shoe or outer casing of the tire may be securely held in place.

Another object of the invention is to so construct this improved tire that it will not be necessary to inflate the same with air and to further so construct the tire that all jolts and jars received in going over rough places in a road may be taken up.

This invention is illustrated in the accompanying drawings, wherein:—

Figure 1 is a longitudinal sectional view through a portion of the improved tire;

Fig. 2 is a transverse sectional view through the improved tire.

This tire will be used in connection with an automobile wheel having a felly 10 and spokes 11, the felly carrying a rim formed of side sections 12 and 13, which sections fit upon the felly with their inner edge portions overlapping as shown in Fig. 2. Side clamps 14 are carried by the tightening bolts 15 and when these tightening bolts 15 are tightened, the side sections of the rim will be moved to tightly clamp the outer shoe or casing 16 of the tire between the side flanges of the rim sections and the band 17 carried by the rim. This band 17 is provided with a plurality of recesses adapted to form seats for receiving anchoring plates to be later described. It will thus be seen that the casing will be securely held in place and cannot slip loose.

The tread plates 18 extend about the tread portion of the tire casing 16 and are curved transversely and longitudinally as shown in Figs. 1 and 2 thus causing these plates to conform to the contour of the tire. The side edge portions 18' of these plates will be curved inwardly out of engagement with the tire casing thus preventing danger of the casing being cut or otherwise injured when the tire is in use. Blocks 19 are formed upon the inner faces of the tread plates 18 and carry pins 20 which pins will extend into the springs 21 engaging the bearing blocks at their outer ends and having their inner ends fitting into the sockets 22 of the bridge plates or anchor plates 23 which are received in the seats formed in the band 17. These bridge plates or anchor plates 23 are provided each with a longitudinally extending passage or chamber 24 and with threaded openings 25 through which extend the threaded inner ends of the fastener bolts or adjusting bolts 26. These adjusting bolts 26 carry collars 27 which prevent them from having longitudinal movement but permit rotary movement so that the adjusting bolts may be turned and as they are turned, the anchoring bars 23 move toward or away from the clamping band 17. From an inspection of the drawings, it will be readily seen that when in use, the outer casing will be held in the extended position shown in Fig. 2 but may be compressed to take up jolts as the automobile moves across rough places in a road. The springs will be strong and durable and not liable to break and may be compressed to increase their strength if so desired by adjusting the screws 26. These screws through engaging the anchoring or bridge plates 23 will serve to hold the anchor plates securely in place and further as these anchoring plates engage the band 17, they will serve as means for holding the band in place and preventing movement of the band which might tend to loosen the tire. When it is necessary to make any repairs or replace the outer casing or any of the parts contained within the outer casing, this can be easily done by removing the clamps 14 at one side of the wheel thus releasing the sections of the rim and permitting the sections to be drawn apart to release the outer casing and permit of its removal. When the necessary repair has been made, the casing may be put back in place or a new one put in place if necessary.

What is claimed is:—

1. The combination with a wheel including a felly and a rim carried thereby, of a band positioned about the rim and having seats formed therein, anchoring plates positioned in the seats of the band and provided with threaded openings, securing screws extending through the felly and rim and having threaded inner end portions extending through the threaded openings of the anchoring plates, collars carried by the securing screws and engaging the band to hold the screws against longitudinal movement, a tire casing having its side portions clamped between the band and rim, tread plates within the tire casing, and springs positioned between the tread plates and anchoring plates.

2. The combination with a wheel rim and tire casing, of a plurality of longitudinally extending anchoring plates mounted interiorly of the casing and each having sockets adjacent each end thereof directed outwardly at an angle and away from each other, means for securing the anchoring plates in position, tread plates engaging the tread portion of the casing interiorly thereof, studs projecting from the tread plates, and a plurality of pairs of coil springs, the springs of each pair being disposed at an angle to each other and each spring having one end received in a socket in an anchoring plate and the opposite end surrounding one of the studs of a tread plate.

In testimony whereof I affix my signature in presence of two witnesses.

GEORGE W. JONHSON.

Witnesses:
PHILIP R. DEMARSE,
F. P. BYRNE.

Copies of this patent may be obtained for five cents each, by addressing the "Commissioner of Patents, Washington, D. C."